(No Model.)

D. F. ADAMS.
JEWELRY.

No. 421,022. Patented Feb. 11, 1890.

WITNESSES.
Geo W Cary
Geo M Leady

INVENTOR.
Dewey F. Adams
by Edson Salisbury Jones
Attorney

UNITED STATES PATENT OFFICE.

DEWEY F. ADAMS, OF PROVIDENCE, RHODE ISLAND.

JEWELRY.

SPECIFICATION forming part of Letters Patent No. 421,022, dated February 11, 1890.

Application filed December 26, 1888. Serial No. 294,691. (No model.)

*To all whom it may concern:*

Be it known that I, DEWEY F. ADAMS, of the city and county of Providence, and State of Rhode Island, have invented a new and useful Improvement in Jewelry; and I do hereby declare the following specification, taken in connection with the accompanying drawings, forming a part of the same, to be a description thereof.

This invention relates to articles of jewelry—such as breastpins, ear-rings, sleeve-buttons, &c.—the bodies of which are composed of two or more cup-shape or hollow members which are to be attached by solder.

The improvement consists in perforating the sides or rims of the cup-shape or hollow members, passing a connecting piece or pieces, preferably in the form of wire, through such perforations, and then soldering such connecting piece or pieces to two or more of the members on the inside or interior thereof, whereby said members will be securely attached to each other in proper relation and so the solder will not be visible on the exterior of said members.

Figure 1:
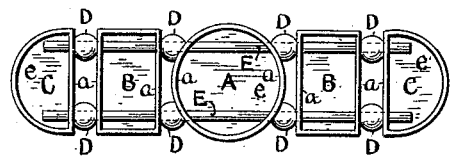
Figure 2:
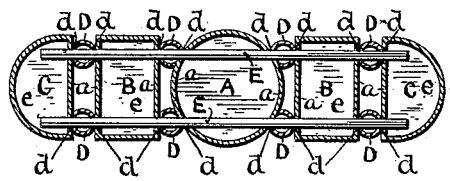
Figure 6:
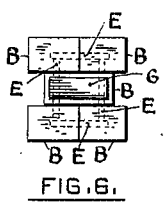
Figure 7:
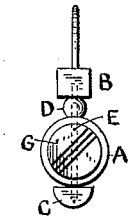
Figure 3:
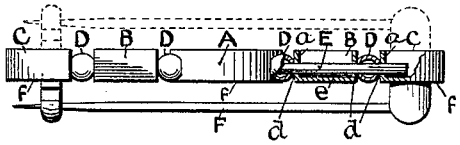
Figure 4:
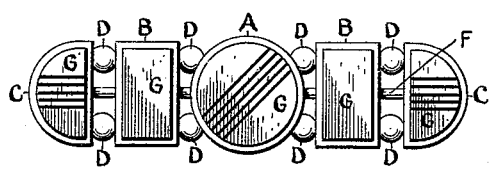
Figure 5:
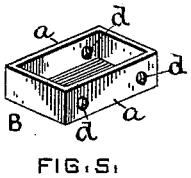

Referring to the drawings, Figure 1 shows a plan view of the body of a breastpin embodying the invention. Fig. 2 represents a horizontal section of the same. Fig. 3 shows a side view of the same, partially in section. Fig. 4 represents a face view of the breastpin with the cup-shape members set with stones. Fig. 5 shows one of the cup-shape members in perspective. Fig. 6 represents a face view of a sleeve-button embodying the invention. Fig. 7 shows a face view of an ear-ring constructed in accordance with my improvement.

The body of the breastpin shown in the drawings is composed of a circular cup-shape member A, two rectangular cup-shape members B, two semicircular cup-shape members C, and eight hollow beads D, placed between said members. The said members or parts, however, may be of any preferred number, design, or shape, and may be made of gold, silver, or other superior metal, of plated metal, or of a suitable inferior material, as desired. The adjacent sides or rims *a* of the cup-shape members A B C are each furnished with one or more perforations *d*, according to the number of connecting-pieces to be used, and the surface of each of the beads D is provided at opposite points with perforations *d*, to admit the passage of the connecting piece or pieces.

In the drawings of the breastpin two connecting-pieces E are shown in the form of round wire; but such pieces may be rectangular, triangular, or oval in cross-section, if desired, and the perforations *d* be made to correspond in outline with that of the connecting-pieces. Upon the connecting-pieces E the members A B C and the beads D are strung, as shown in Figs. 1 and 2, and said connecting-pieces are then soldered to the interior or inner surface *e* of the two end members C, and may also be soldered to the inner surfaces of the member A and the members B B, if desired. It will thus be seen that as all the soldering is upon the inside or inner surface of the cup-shape or hollow members no solder will show on the exterior of the article. This secures a greatly-improved appearance, as will be readily understood when it is considered that as ordinarily constructed the beads D would be soldered to the exterior surface of the sides or rims *a* of the members A B C, and the solder being of a different color from the members, or liable to turn a different color by oxidation, the appearance of the article would be detrimentally affected. It will also be understood that far less care will be necessary when said members or parts are connected by solder applied to the interior thereof than would be required in soldering when the solder is applied to the exterior surface of the parts; and it will be further understood that in accordance with my improvement the proper position of the members or parts relatively to each other can be very much more readily and accurately secured than if said parts were soldered to each other exteriorly, when great care, much time, and more or less binding or staying would be necessary to locate and preserve the parts in proper relation both before and during the soldering operation. With my improvement the article is also much stiffer and stronger.

If the breastpin is to be set with stones, the pin-tongue F is attached to the outer surface *f* of the article, as shown by full lines in Fig. 3, and the stones G are inserted into the cups and there secured in any preferred manner, as shown in Fig. 4. If no stones are to be set in the pin, the pin-tongue may be attached to the inner surface e of the article, as shown by dotted lines in said figure, and the face or outer surface f be chased, engraved, or otherwise ornamented, if desired.

In the sleeve-button shown in Fig. 6 the four cup-shape members B are secured to each other by connecting pieces or wires E, (shown by dotted lines,) which pass through perforations in the adjacent sides or rims of said members, as hereinbefore explained.

In the ear-ring shown in Fig. 7 a single connecting piece or wire E (shown in dotted lines) is employed to join the members A B C and the bead D, the said wire being soldered to the inner surface of two or more of said members and passing through perforations in their sides or rims.

What I claim, and desire to secure by Letters Patent, is—

As an improved article of manufacture, a breastpin, sleeve-button, or other article of jewelry having its body composed of two or more hollow or cup-shape members or parts, the adjacent sides or rims of which are perforated, and a connecting piece or pieces passing through all said perforations from end to end of the article and soldered to the inner surface of two or more of said members, whereby the members are rigidly connected with each other without the exposure of solder upon their exterior surfaces, substantially as set forth.

DEWEY F. ADAMS.

Witnesses:
EDSON SALISBURY JONES,
GEO. M. CADY.